United States Patent [19]

Lee

[11] Patent Number: 4,458,669
[45] Date of Patent: Jul. 10, 1984

[54] BUILDING HEATING SYSTEM

[76] Inventor: Kap-Joong Lee, 1542-10 Shinrim-Dong, Kwan AK-Ku, Seoul, Rep. of Korea

[21] Appl. No.: 464,958

[22] Filed: Feb. 8, 1983

Related U.S. Application Data

[62] Division of Ser. No. 239,498, Mar. 2, 1981, Pat. No. 4,385,625.

[51] Int. Cl.³ ............................................. F24J 3/02
[52] U.S. Cl. .................................... 126/420; 126/437
[58] Field of Search ............... 126/418, 420, 423, 433, 126/432, 437

[56] References Cited

U.S. PATENT DOCUMENTS

| | | | |
|---|---|---|---|
| 4,044,949 | 8/1977 | Morawetz | 126/437 |
| 4,060,916 | 12/1977 | Finigan | 126/437 |
| 4,108,160 | 8/1978 | Harper | 126/420 |
| 4,121,566 | 10/1978 | Radenkovic | 126/420 |
| 4,122,830 | 10/1978 | Hapgood | 126/437 |
| 4,169,460 | 10/1979 | Popovich | 126/422 |
| 4,246,890 | 1/1981 | Kraus et al. | 126/433 |
| 4,253,446 | 3/1981 | Müller | 126/437 |
| 4,257,479 | 3/1981 | Newton | 126/435 |
| 4,258,334 | 8/1981 | Collins | 126/435 |
| 4,263,961 | 4/1981 | Morawetz | 126/436 |
| 4,269,167 | 5/1981 | Embree | 126/437 |
| 4,281,637 | 8/1981 | Wilson | 126/437 |
| 4,281,639 | 8/1981 | Kuronen | 126/437 |
| 4,284,062 | 8/1981 | Swindle | 126/423 |
| 4,285,333 | 8/1981 | Tanaka | 126/433 |
| 4,287,879 | 9/1981 | Roark | 126/435 |
| 4,324,228 | 4/1982 | Shippee | 126/437 |
| 4,335,706 | 6/1982 | Passarelli | 126/437 |
| 4,336,692 | 6/1982 | Ecker | 126/435 |
| 4,380,229 | 4/1983 | Glasgow | 126/432 |

Primary Examiner—Daniel J. O'Connor
Attorney, Agent, or Firm—Woodling, Krost, Rust & Hochberg

[57] ABSTRACT

A building heat collection, storage and exchange system adapted for use with a solar collector, and featuring a specially designed heat storage tank. The closed system contains both liquid and gas, and is provided with drain reservoirs so that when heat is not being absorbed, the solar collector is drained, and the gas replaces the liquid in the collector. By the use of liquid intake and dispersal devices which eliminate turbulence, the heat storage tank maintains stable temperature zones. The most efficient extraction of stored heat is thus promoted.

4 Claims, 10 Drawing Figures

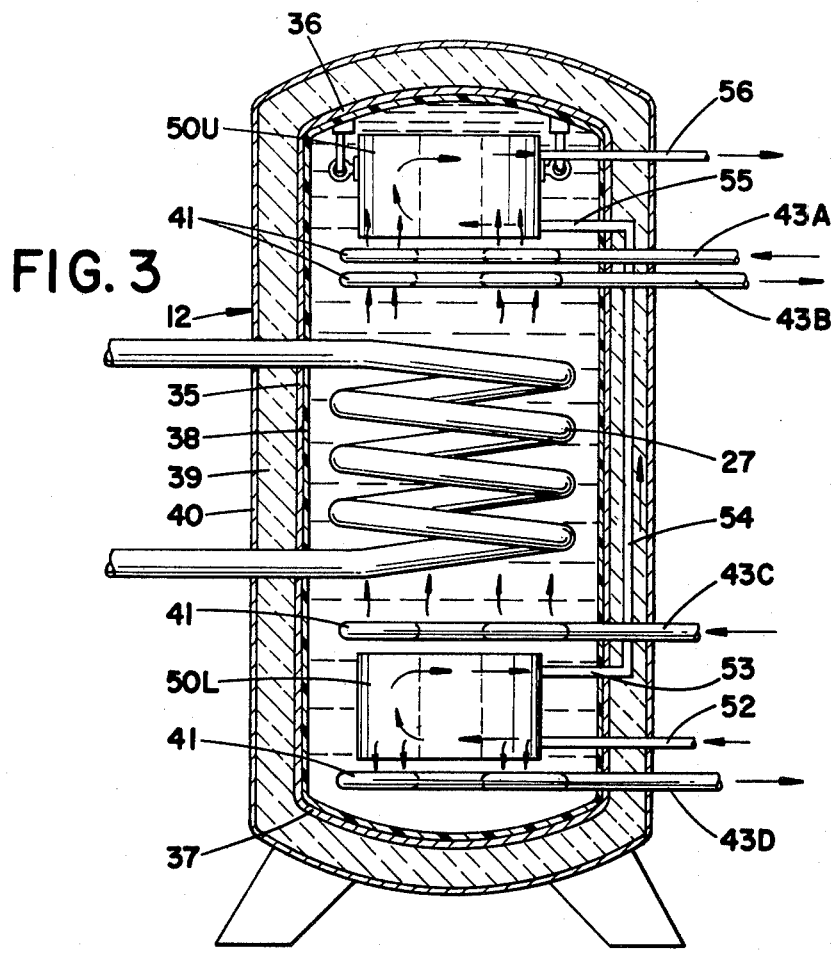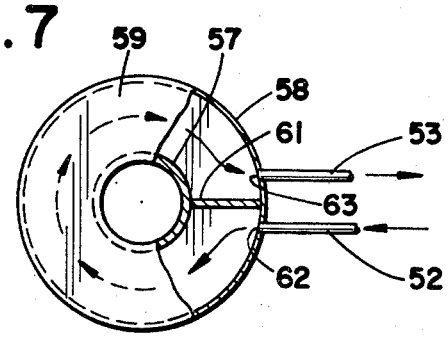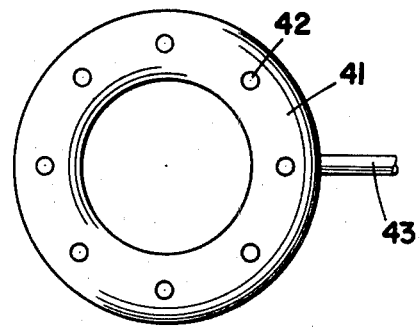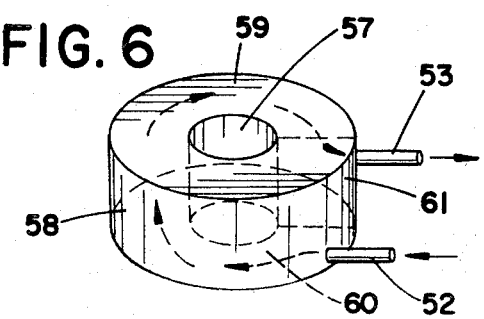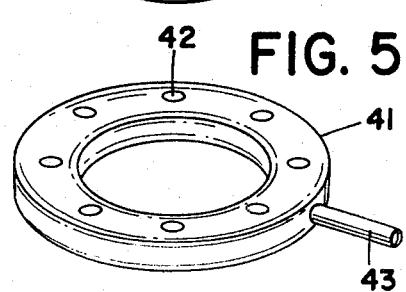

BUILDING HEATING SYSTEM

This is a division of application Ser. No. 239,498, filed Mar. 2, 1981, now U.S. Pat. No. 4,385,625.

The present invention relates to building heat collection, storage and exchange systems. More particularly it relates to closed solar heating systems, which may have conventional heating means to supplement the solar heat source, and which are used both for space and water heating.

A system which uses liquid to distribute heat may be either open, that is, communicating with the outside air, or closed. Each of these types of system has its own disadvantages, especially in systems using solar heat collection panels. In a closed system containing water, the overnight fall in temperature of the solar panel will expose the system to freezing and cracking unless the solar panel and exterior piping can be drained. It has been proposed to use antifreeze in such systems, but the resultant expense, inconvenience in case of leakage, and danger in case of leakage into the hot water system make this a less than optimal solution to the problem.

Drainage of the solar panel can be obtained by admitting air into the system. A disadvantage of such an open system is that the repeated introduction of fresh air into the system provides an environment which promotes corrosion of the pipes.

Another common disadvantage in solar heating systems is that as the day's stored heat is withdrawn from the system at night, it is withdrawn too rapidly and inefficiently at first, so that by morning there is insufficient heat remaining for the needs of the building's occupants. The most efficient system would be one which extracts stored heat at exactly the temperature needed for the particular application, returns any unused heat to storage, and has a sufficiently high capacity that wasteful temperature fluctuations are avoided.

Accordingly, it is an object of my invention to provide a highly efficient closed solar heating system wherein the heat transfer liquid may be ordinary water, but which is not susceptible to freezing or corrosion of the pipes.

Another object of my invention is to provide a heating system and heat storage means which, by avoiding turbulence, permits the most efficient use of stored heat.

The novel features characterizing my invention are pointed out with particularity in the claims annexed to and forming a part of this specification. For a better understanding of the invention, its advantages and specific objects attained with its use, reference should be made to the accompanying drawings and descriptive matter, in which are illustrated and described various preferred embodiments of my invention.

In the attached drawings,

FIG. 3 is a cross-sectional elevation view of the heat storage tank of my invention;

FIG. 4 is a plan view of a liquid transfer ring used in the heat storage tank;

FIG. 5 is a perspective view of the liquid transfer ring;

FIG. 6 is a perspective view of a heat exchanger tank used within the heat storage tank of my invention;

FIG. 7 is a plan view of FIG. 6 with portions cut away;

DESCRIPTION OF THE PREFERRED EMBODIMENT

Figure 1:
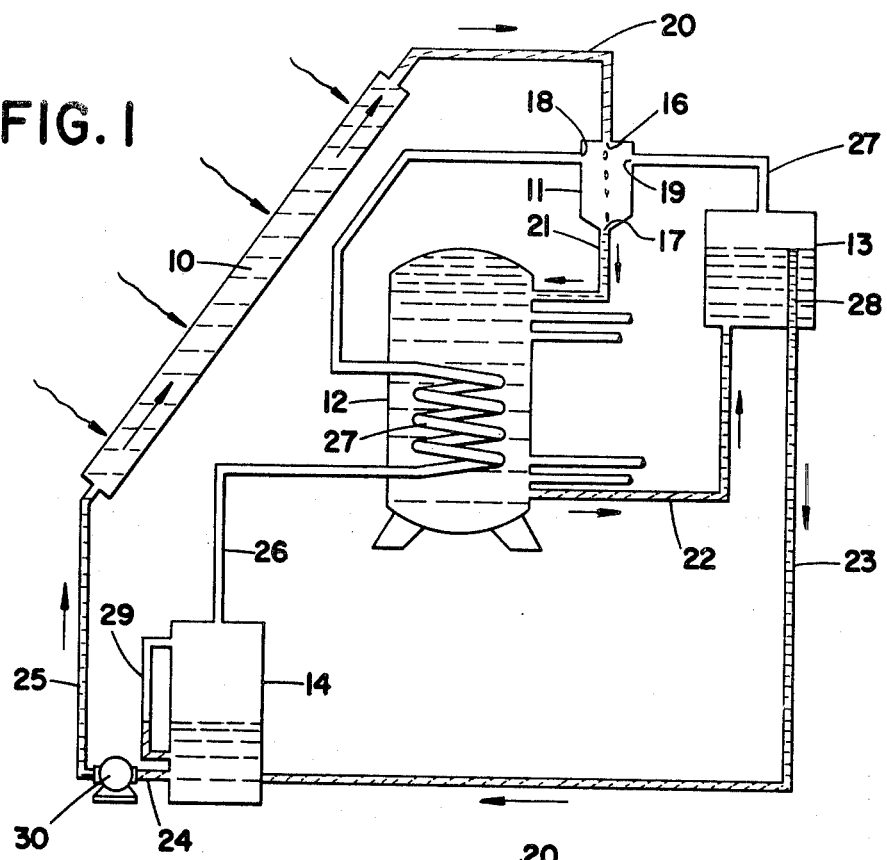
FIG. 1 is a diagrammatic elevational view of the heating system of the present invention, while in the process of collecting solar energy and transferring it to storage.

With reference to the drawings as listed above, a description of the entire heating system is presented with reference first to FIG. 1, which shows in diagrammatic form the system in its normal daytime mode of operation. Water partially fills the drain tank 14, being drawn therefrom into piping or other conduit means 24 by the suction created by a pump 30. The direction of water flow is shown by straight arrows. The action of the pump 30 forces the water through conduit means 25 and in an upward direction through a solar heat collector 10, where the water absorbs heat from the sun's rays, shown as wavy arrows. It will be seen that although the pump is here depicted as being located between the drain tank 14 and solar heat collector 10, it could as well be placed at other locations in the circuit herein described.

The heated water then passes into conduit means 20 which conducts it through port 16 into an exchange tank 11, from which it passes through port 17 into conduit means 21 and thence into the top of a vertical heat storage tank 12.

Colder water is then forced, by the pressure in the system, out the bottom of the heat storage tank 12 and into conduit means 22 which enters the bottom of a reservoir 13. The reservoir 13 is partially filled with water. The water level in reservoir 13 is limited by a standpipe 28, the top of which is above the level of the heat storage tank 12, so that as water flows into the reservoir 13 from the heat storage tank 12 via conduit means 22, a corresponding amount of water will drain out of the reservoir 13 through the standpipe 28. The standpipe 28 is connected to conduit means 23 which carries the water back to the drain tank 14. The drain tank 14 is provided with a water level gauge 29 adapted with any conventional valve means for introducing more water into the drain tank in case of loss through leakage.

The system also encloses a quantity of air. Air is contained in the spaces above the water in the partially filled drain tank 14 and reservoir 13, and in the exchange tank 11. These spaces are made continuous by conduit means 26, which joins the drain tank 14 to the exchange tank 11, and conduit means 27, which joins the exchange tank 11 to the reservoir 13.

Conduit means 26 has an intermediate coiled portion 27 which is contained within the heat storage tank 12. The function of the coiled portion 27 is to condense any steam that may arise in the solar heat collector 10, as for example if the collector is already hot when the pump 30 begins to move water through it. In this way the pressure within the system is maintained within acceptable limits.

Figure 2:
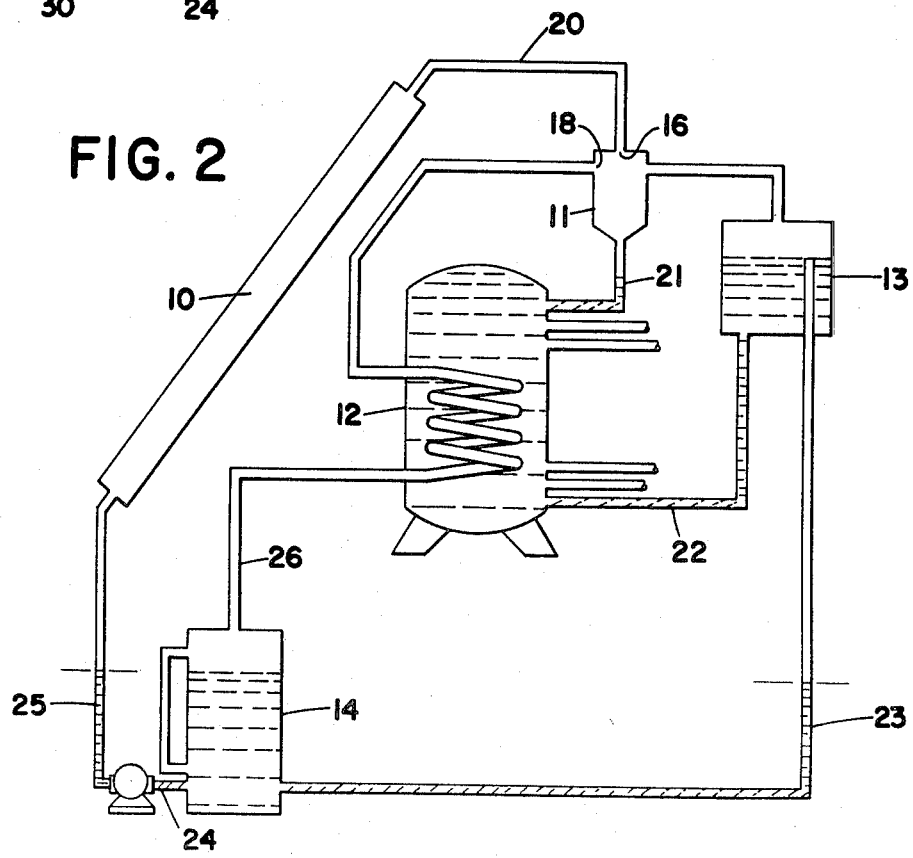
FIG. 2 is a diagrammatic elevational view of the same system while not transferring solar energy to storage.
Figure 8:
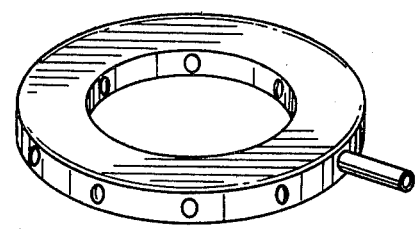
FIG. 8 is a perspective view of an alternative form for the liquid transfer ring of FIG. 4.
Figure 9:
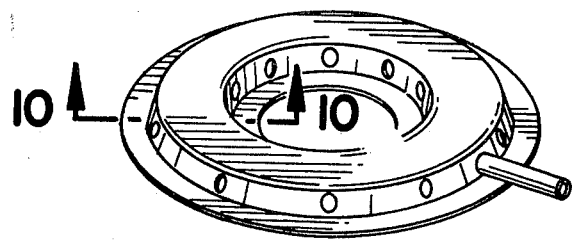
FIG. 9 is a perspective view of yet another alternative construction for the liquid transfer ring.
Figure 10:
FIG. 10 is a section of the liquid transfer ring of FIG. 9, taken across the line 10—10.

The function of the exchange tank 11 and reservoir 13 can be seen when the pump is shut off. The water in the collector 10 and conduit means 20 is then permitted to fall by the force of gravity back into the drain tank 14, and the air therein is pushed up through conduit means 26 and through port 18 into the exchange tank 11. From there the air enters through port 16 into conduit means 20 and thence into the solar collector 10, replacing the drained-away water. At the same time, water ceases to flow through the heat storage tank 12 and into the reservoir 13. Since no further water enters standpipe 28, the water in it and in conduit means 23 falls to a common level with the water in conduit means 25 and the drain tank 14. The result is seen in FIG. 2, which portrays the system when the pump 30 is off, as ordinarily at night. It will be seen that in this mode there are present in the system two distinct volumes of water: that volume in the heat storage tank 12, reservoir 13 and conduit means 21 and 22, and that volume in the drain tank 14 and conduit means 23, 24 and 25. However, there is a common air volume above both volumes of water, so that when the pump is re-started, the water levels are permitted to readjust without the building up of vacuums or high pressure spaces, and without the need for special valving.

Although the system has been described as enclosing water and air, it can readily be seen that other fluids may be used where more appropriate under given conditions. It is only necessary that the heat-carrying liquid be more dense than the gas. In particular, to further minimize corrosion and bacterial growth it may be desired to substitute pure nitrogen or an inert gas for the air in the system, or to treat the water with additives.

The closed heating system of my invention combines the best features of both closed and open systems in that it permits water to be used in the system, while providing for the water to be drained away from the solar heat collector and exterior plumbing at night and during other times when the water in the solar collector would freeze, by simply turning off the pump 30. The pump may be turned off either by hand or automatically; in winter, for example, it may be controlled by a thermostat in the solar heat collector.

An important part of my invention is the heat storage tank 12 which is especially designed for efficient operation and high capacity. These aims are accomplished by its large size and by the means used to transfer water and heat in and out of the tank.

The heat storage tank 12 is seen in more detail in FIG. 3. The tank wall is a vertical cylinder 35, preferably of steel, having a top 36 and bottom 37, and an inner lining 38 preferably of red lead or epoxy resin. If used for space heating, its capacity should preferably be 50 to 60 liters per square meter area of collector.

The entire outside of the heat storage tank is covered with a layer of insulation 39, of any of various combinations of composition and thickness well known to those skilled in the art. The insulation 39 is then covered with an outer cylindrical shell 40, made of metal or other durable substance.

In FIGS. 3, 6 and 7, arrows show the direction of water flow. Water is added to and removed from the heat storage tank 12 through holes in four flattened hollow rings 41. An example of such a ring 41, with holes 42 and tubular connecting means 43, is shown in FIGS. 4 and 5. The rings 41 are used to add heated water from the collector to the top of the tank through connecting means 43A, to withdraw water from the bottom of the tank, through connecting means 43D, and into the system for pumping to the collector, to withdraw hot water for space heating from the top of the tank through connecting means 43B and to return water from the space heating system to a zone near the bottom of the tank, through connecting means 43C. The importance of the construction of the rings 41 is that by the use of a number of holes 42 to disperse or take in the water, turbulence is avoided in the heat storage tank 12. This permits the maintenance of temperature zones in the heat storage tank so that stored heat can be extracted at the appropriate temperature as desired. By thus avoiding unnecessary heat loss, the efficiency of the system is enhanced.

Referring again to FIG. 3, the extraction of heat to provide a hot water supply for domestic use is achieved by two heat exchangers 50U, 50L of essentially identical construction, contained within the heat storage tank 12. Th heat exchanger capacity should preferably be from 50 to 135 liters per occupant per day for residential, hotel or hospital use, or about 15 liters per occupant per day in an office building. The appropriate capacities of storage tank and heat exchanger will of course vary with the physical characteristics and location of the building.

The lower heat exchanger 50L is provided with a lower inlet pipe 52 connected to the supply of water to be heated, and a lower output pipe 53. The upper heat exchanger 50U is similarly provided with an upper inlet pipe 55, and an upper outlet pipe 56 through which heated water is supplied for consumption. The heat exchangers 50L and 50U are joined by pipe 54 connecting lower outlet pipe 53 to upper inlet pipe 55. Pipe 54 is shown as passing through the insulation 39 of the heating tank 12 but it may instead be located inside the heating tank 12.

The construction of the heat exchanger 50L is shown in FIGS. 6 and 7. (Heat exchanger 50U is constructed substantially identically.) It is of generally toroidal shape, having a vertical inner cylindrical wall 57, a vertical outer cylindrical wall 58, a generally horizontal, but somewhat rounded top 59 and bottom 60, and an enclosed radial wall 61. The radial wall 61 extends radially between inner wall 57 and outer wall 58, and extends vertically between top 59 and bottom 60. Its intersection with outer wall 58 occurs at a vertical line which lies between the openings 62 and 63, respectively, of lower inlet pipe 52 and lower outlet pipe 53 into the lower heat exchanger 50L. Because of the radial wall 61, water entering the lower heat exchanger 50L through lower inlet pipe 52 on one side of radial wall 61 must flow circumferentially (as shown by arrows in FIGS. 6 and 7) through the lower heat exchanger 50L to the other side of the radial wall 61 in order to reach the lower outlet pipe 53.

It is an important feature of my invention that the capacity of the heat exchangers 50L and 50U is substantially larger than that of the more usual coil-type heat exchangers. Another important feature is the provision of two heat exchangers, one in the lower part of the heat storage tank for pre-heating the water, and the other in the upper part, for bring the water to a higher temperature. By these means, as well as by the high capacity of the heat storage tank itself, quantities of hot water may be used when needed without their withdrawals causing undue temperature changes and redistribution of the various temperature zones in the heat storage tank. Thus the efficiency of operation attributable to the temperature zones is promoted.

It may be desired to provide auxiliary heating during times when the amount of heat collected from the solar collector is insufficient for both water heating and space heating. For example, an oil or gas boiler may be used in conjunction with the space heating system. Alternatively, auxiliary heat may be provided directly to the interior of heat storage tank 12, as by an electric heating coil in the middle regions of the tank. In these cases, the locations within the heat storage tank 12 of the various rings 41 may be other than shown in FIG. 3, since the temperature zones will vary with the particular form and location of auxiliary heating.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

What is claimed is:

1. A closed building heating system containing a liquid and a gas and comprising
    a solar heat collector adapted to transfer solar energy to said liquid and heat said liquid thereby;
    liquid storage means adapted to contain a first quantity of said liquid with a first space, containing said gas, above said first quantity;
    first conduit means connecting said solar heat collector to said first space;
    drain reservoir means connected to said solar heat collector by second conduit means, said drain reservoir means being adapted to contain a second quantity of said liquid with a second space, containing said gas, above said second quantity;
    third conduit means connecting said liquid storage means to said drain reservoir means;
    gas conduit means connecting said first space in said liquid storage means to said second space in said drain reservoir means;
    pump means for urging said liquid through said closed system;
    said drain reservoir means being located such that when said pump means ceases operation, the force of gravity urges said liquid from said solar heat collector toward said drain reservoir means; and
    said third conduit means being adapted such that when said pump means ceases operation, flow of said liquid, between said first quantity in said liquid storage means and said second quantity in said drain reservoir means, is prevented.

2. The system of claim 1 and in which said third conduit means connects said first quantity of liquid to said drain reservoir means when said pump is operating but connects said first space to said drain reservoir means when said pump is not operating.

3. The system of claim 1 and further comprising gas condensation means whereby portions of said liquid which have entered the gaseous state may be condensed back to the liquid state.

4. The system of claim 1 and in which said liquid storage means comprises
    heat storage means adapted for the storage of said liquid and transfer of heat from said liquid to other matter;
    storage reservoir means connected by said third conduit means to said drain reservoir means; and
    fourth conduit means connecting said heat storage means to said storage reservoir means.

* * * * *